2,824,736
Patented Feb. 25, 1958

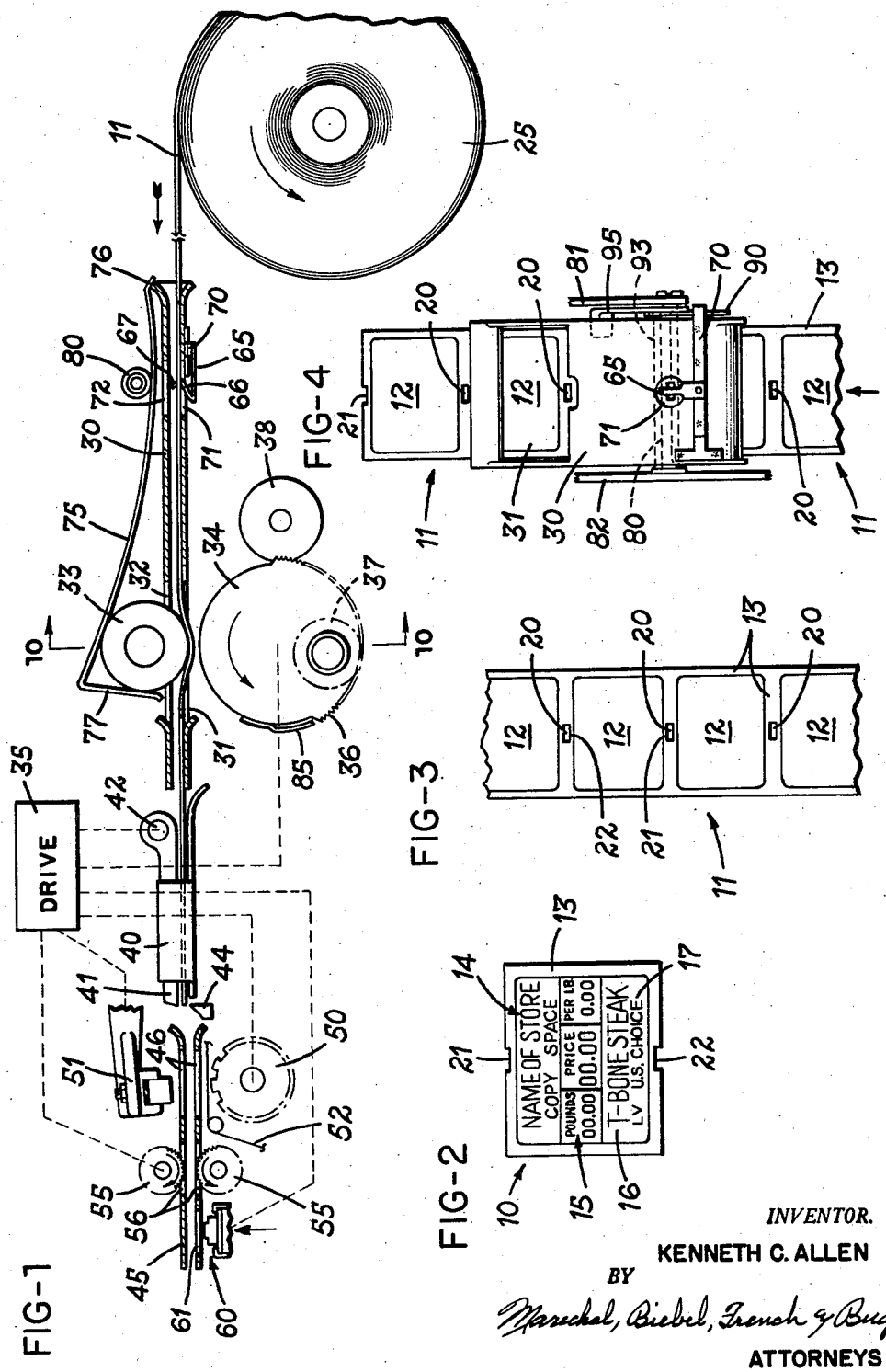
Feb. 25, 1958 — K. C. ALLEN — 2,824,736
TICKET PRINTER
Filed April 21, 1955 — 2 Sheets-Sheet 1
INVENTOR.
KENNETH C. ALLEN
BY
Marechal, Biebel, French & Bugg
ATTORNEYS

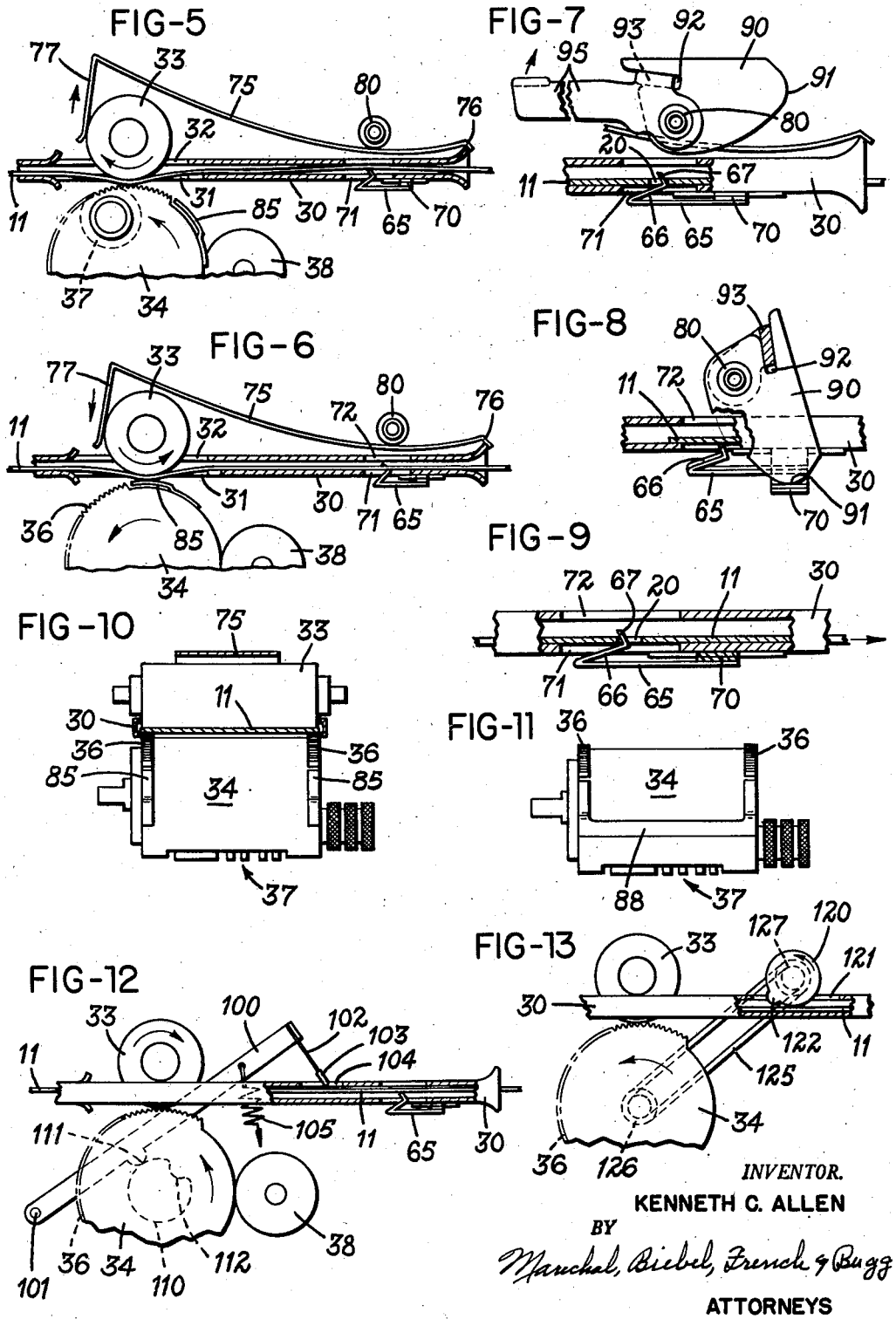

United States Patent Office 2,824,736
TICKET PRINTER

Kenneth C. Allen, Dayton, Ohio, assignor to Hobart Manufacturing Company, Troy, Ohio, a corporation of Ohio Application April 21, 1955, Serial No. 502,849

9 Claims. (Cl. 271—2.6)

This invention relates generally to apparatus and methods of effecting accurately controlled feeding of a strip of tickets, labels or the like.

The invention has particular relation to apparatus and methods for intermittently advancing, printing and issuing successive tickets, labels or the like from a strip thereof, and it has special application to such apparatus and methods for handling such strips wherein the individual tickets or like sections of the strip are specifically identified on the strip, as by individual design or preliminary printing, to such extent that the final printing thereon in conjunction with issuance thereof must be accurately registered lengthwise of the strip.

As an illustrative example of the subject matter of the invention, it is explained hereinafter in connection with a scale which is constructed as a complete unit to weigh food products or other commodities and to issue a printed ticket bearing thereon both the weight and the computed value of the weighed material. Scales of this character are particularly useful for food markets of the self-service type selling commodities such as meat in prepackaged form, with the printed label being attached to the package before the package is placed in the display case ready for selection by the customer. It is valuable from the standpoint of advertising, for example, that the printed ticket or label received by the customer clearly identify the store, and this value is further enhanced by the use of attractive designs and/or color combinations on the printed ticket. It is difficult, however, as a practical matter to do all the printing necessary to this end within the scale or other issuing unit.

The advantages outlined above can be achieved without the attendant practical difficulties if the ticket is preprinted with the desired advertising and/or design material so that the scale is required only to print the results of the weighing operation and other variable data such as the identity and/or grade of the particular commodity. This in turn, however, introduces relatively strict requirements of accuracy for the feeding of the ticket strip, since the data printed by the scale should register properly with respect to the printed material. Thus unless feeding of the ticket strip is in accurately controlled increments of one ticket at a time, the successive ticket sections of the strip may progressively get out of register with the printing station of the scale, with resulting possible spoilage of tickets.

It is a primary object of the present invention to provide apparatus and methods for feeding a strip composed of multiple tickets, labels or like sections which will effect the feeding of the strip in accurately controlled increments such that only a predetermined precise length of the strip will be advanced during each feeding cycle, and which apparatus will at the same time be comparatively simple and compact in construction and will possess minimum requirements from the standpoint of maintenance.

An additional object of the invention is to provide strip feeding apparatus as discussed above which includes mechanism for establishing positive register between perforations in the ticket strip and a stop member located in fixed relation with the printing station of the apparatus such that the precise proper section of the ticket strip will register with the printing station before the printing operation takes place.

A further object of the invention is to provide strip feeding apparatus and methods for purposes such as outlined above which utilize a simple friction drive for the ticket strip in cooperation with a single series of perforations spaced lengthwise of the strip at intervals equal accurately to the desired length of a single ticket.

It is also an object of the invention to provide strip feeding apparatus as outlined above which is adapted for incorporation in existing ticket printing machines for handling unprinted ticket strips and which will enable the converted machine to handle a preprinted ticket strip and to print and to issue successive tickets therefrom on which additional data is printed in the machine in consistently accurate registered relation with the preprinted portions of the ticket.

Other objects of the invention will be apparent from the following description, the accompanying drawings and the appended claims.

In the drawings—

Fig. 1 is a somewhat diagrammatic view illustrating strip feeding, printing and issuing apparatus constructed in accordance with the invention;

Fig. 2 is a somewhat diagrammatic view illustrating an example of a single ticket of the type issued by the apparatus of Fig. 1;

Fig. 3 is a view similar to Fig. 2 showing a fragment of the strip of tickets handled by the apparatus of Fig. 1;

Fig. 4 is a fragmentary view of the under side of a portion of the apparatus of Fig. 1;

Fig. 5 is a fragment of Fig. 1 showing a moved position of certain of the parts;

Fig. 6 is a view similar to Fig. 5 showing a further moved position of the parts;

Figs. 7 and 8 are enlarged fragmentary and somewhat diagrammatic views further illustrating the operation of the apparatus of Fig. 1;

Fig. 9 is a view similar to Fig. 7 showing the positions of certain of the parts during threading of a new tape into the apparatus;

Fig. 10 is a section on the line 10—10 of Fig. 1;

Fig. 1 is a partial view similar to Fig. 10 and showing an alternative construction; and Figs. 12 and 13 are diagrammatic views generally similar to Fig. 6 showing alternative means for effecting reverse feeding of the strip.

Referring to the drawing, which illustrates preferred embodiments of the invention, Fig. 2 shows an illustrative example of a single ticket 10 of the type issued by a scale operating in conjunction with the apparatus of the invention for use by a food market in prepackaging meat. As shown, such ticket may be preprinted to carry the name of the store and a variety of other copy selected in accordance with individual preference. Such preprinted material may appear on each successive ticket portion of an elongated strip 11 of blank tickets as shown in Fig. 3. Each ticket portion 12 on the strip may also be provided with a decorative border 13 of a contrasting color or other design, and the preprinting of the strip may also include the name of the store as indicated at 14 as well as the headings for the weight, price and price-per-pound as shown at 15 in Fig. 2.

With each ticket portion 12 thus specifically designated on the strip 11 by the preprinted matter, the ticket issuing portion of the scale assembly is required only to print the identity and grade of the commodity as indicated at 16 and 17 in Fig. 2, together with its weight, price-per-pound and computed value. On the other hand, with the major part of the ticket or label preprinted, feeding of the ticket strip must be acurately controlled in order to assure that the final printing in conjunction with the weighing operation will always be accurately in register with the spaces intended therefor for the successive individual tickets. The present invention is especially directed to the accomplishment of this object.

In accordnace with the invention, the ticket strip 11 is provided with a series of perforations 20 which are located in accurately spaced relation lengthwise of the strip, centrally in the margin between adjacent tickets so that the spacing of each adjacent pair of perforations is accurately equal to the desired dimension of the individual ticket 10 lengthwise of the strip. While the configuration of the individual perforations is primarily a matter of choice, they are shown as rectangular slots each having a forward leading edge 21 and a trailing edge 22, and the individual tickets 10 are indicated as severed along approximately the middle of these slots.

The mechanism for feediIng and printing the tickets is shown in Fig. 1 as including a supply roll 25 from which the ticket strip 11 is fed through an elongated chute 30 having slots 31 and 32 in the upper and lower walls thereof through which the strip is engaged for feeding by a rubber pressure roll 33 in cooperation with a driven cylinder 34 operated intermittently by the main drive which is indicated diagrammatically at 35 and which may, for example, be of the construction shown in Robertson Patent No. 2,056,486 issued October 6, 1936. The nature of this drive is not critical for the purposes of the invention beyond the single requirement that the drive should provide for one full revolution of the cylinder 34 for each feeding cycle of the apparatus. The feeding action of the cylinder 34, however, occupies less than the full revolution and is controlled by knurled or otherwise raised or roughened feed rail portions 36 of the cylinder 34 which are coordinated with the actual length of each ticket portion 12 to provide a feeding stroke for the strip which is slightly in excess of the length of a single ticket.

Thus each time the drive 35 is operated, the cylinder 34 will make one complete revolution, and during the interval while its feed rail portions 36 are in pressure engagement with the strip 11 and roll 33, the strip will be fed forward, but during the remainder of the revolution of the cylinder 34, there will be no forward feeding of the strip. The cylinder 34 is also shown as having incorporated therein an adjustable means 37, such as type wheels or an electro, which may be employed to print some of the desired data on each ticket 10, such particularly as the grade of the commodity and/or other identifying data of the type indicated at 17 in Fig. 2. A detailed disclosure of suitable such printing mechanism is found in Robertson Patent No. 1,816,263 issued July 28, 1931, and its cooperating inking roller is shown at 38.

From the feeding chute 30 the ticket strip 11 passes to the knife chute 40 which is carried by a knife 41 pivotally mounted at 42 for cooperative movement towards and away from a stationary cutoff bar 44 to shear successive tickets from the strip. Beyond the knife chute 40 is a further guide chute 45 which is slotted at 46 to provide a printing station receiving cooperating printing wheels 50 and an impression hammer 51 for printing the weight, price and price-per-pound of the weighed commodity on successive ticket blanks 12, the printing ribbon for the impression hammer 51 being indicated fragmentarily at 52.

Movement of the printed ticket beyond the printing station is under the control of a pair of ejector wheels 55 operating in additional slots 56 in the chute 45 beyond the printing station. Fig. 1 also shows a key 60 located beyond the ejector wheels 55 for printing the commodity designation 16 on the ticket through a slot 61 in the underside of chute 45. The mechanism by which these several parts are set and operated may be automatically controlled by the weighing action of the scale or may be of any convenient manually actuated character and forms no part of the present invention. A suitable such mechanism for the ejector rolls, knife and other associated parts is shown, for example, in the above noted Robertson Patent 2,056,486.

In accordance with the present invention, accurate register of each successive ticket 10 with relation to the printing station and the cutoff bar 44 is established by control of the feeding of the strip in such manner that during each feeding cycle of the roll 33 and cylinder 34, the strip is first fed forward a distance slightly greater than the length of a single ticket blank 12. Then during the remainder of the cycle, the strip 11 is fed in the reverse direction sufficiently to engage one of the slots 20 with a stop member located in a position spaced from the cutoff bar 44 by a distance accurately correlated with the length of one or more complete ticket blanks 12 such that the shearing action will take place at the desired point between the leading pair of tickets on the strip.

A stop member provided in accordance with the invention includes an arm 65 of resilient material formed as shown to provide a hook 66 proportioned to extend through one of the slots 20 and having a back surface 67 which is inclined toward the point of the hook in the direction of forward travel of the strip. The base end of the arm 65 is secured to a supporting arm 70 of resilient material which in turn is secured to the chute 30 adjacent one side edge thereof and extends across below the chute to support the stop hook 66 in position to project through an opening 71 in the adjacent side of the chute 30 and thus into the path of the ticket strip 11 through the chute, a similar opening 72 being provided in the top of the chute to prevent interference with proper operation of hook 66. In an installation arranged to provide the configuration of ticket shown in Fig. 2 wherein each ticket is cut off along substantially the center of the slots 20 at the top and bottom thereof, the spacing of the hook 66 from the cutoff bar 44 will be equal to a whole number of ticket lengths minus one-half the smaller dimension of a single slot 20.

The desired reverse feeding movement of the ticket strip 11 following each forward feeding movement thereof is obtained by means of a spring drive member 75 which is so arranged that it is tensioned during the driving of the pressure roll 33 for forward feeding by cylinder 34 and then is released to drive pressure roll 33 in the reverse direction when the forward driving action of the feed rails 36 is completed. This spring drive member 75 is shown as of flat spring material and generally L-shape which is mounted as shown in such manner that its rearward end 76 hooks over the entering end of the chute 30 and its forward end 77 is similarly hooked over and in partial engagement with the forward surface of the roll 33. The spring 75 is held in biased relation toward roll 33 by a shaft or rod 80 which extends across the chute 30 just above stop member 65 and is supported at opposite ends by the side plates 81 and 82 of the printer frame.

In operation, the forward feeding movement of the ticket strip 11 for each operating cycle of the drive 35 will cause advance of the ticket strip to the extent provided by the peripheral length of the feed rails 36 as described. This operation is indicated in Fig. 5, which also shows how during this action, the pressure roll 33 will force the spring 75 upwardly by the frictional contact thereof with the spring portion 77, thus tensioning the spring. As soon as the feed rails 36 have passed out of engagement with pressure roll 33, however, the roll 33 will be free to turn in the opposite direction, and spring 75 will immediately return to its normal rest position shown in Fig. 1. This action of the spring will cause roll 33 to rotate in counterclockwise direction as shown in the drawing, and this movement of roll 33 will cause the desired slight retracting movement of the ticket strip.

In order to assure adequate driving engagement between the ticket strip and roll 33, it has been found desirable to provide means on the cylinder 34 for lightly biasing the strip 11 against the pressure roll. Such spring means may be provided by a pair of flat spring members 85 constructed and mounted as shown in Fig. 10 at opposite ends of the cylinder 34. Each spring member 85 has one end secured to the cylinder, while its opposite end is offset radially from the surface of the cylinder for yielding engagement with the roll 33. Thus during rotation of cylinder 34, the spring strips 85 press the ticket strip 11 into frictional feeding engagement with roll 33 just after the forward feeding of the strip by the feed rails 36 has been completed, but at the same time these spring strips should be sufficiently smooth to permit the ticket strip to slip thereon in view of the fact that the spring strips are being driven in the opposite direction from the desired reverse feeding of the ticket strip. Fig. 11 shows an alternative construction of spring means for the same purpose as the springs 85 and comprising a single spring strip 88 of generally U-shape having its ends secured to the cylinder 34 and its mid-portion supported yieldingly outwardly from the surface of the cylinder.

The action of this apparatus will be readily understood by considering a complete feeding cycle starting from the position shown in Fig. 9 in which the hook 66 is in engagement with the leading edge 21 of one of the slots 20 in the ticket strip 11. When the feeding cycle of cylinder 34 begins, the strip will move forward, namely to the left as viewed in Fig. 9, and the trailing edge 22 of the slot 20 will engage the inclined surface 67 of hook 66, thus producing a camming action effecting disengagement of the strip from the hook so that the proper forward feeding will occur. The feed rails 36 are of such length as described that when they complete their engagement with the strip, the latter will be fed forward a distance which is just enough greater than the length of a single ticket 10 to cause the hook 66 to engage in the next slot 20 as indicated in Fig. 7, the natural spring force of the stop arm 65 being such that the hook 66 is at all times biased toward the ticket strip, as indicated in Fig. 5. Then during the reverse driving of roll 33 by spring 75, as shown in Fig. 6, the strip will retract until the leading edge 21 of the slot 20 in which the hook 66 is engaged will come into stopped contact with the hook as shown in Fig. 9, which will positively stop the strip in the desired accurately registered relation with the printing and cutoff stations.

Provision is also made in accordance with the invention for retracting the stop member 65 out of the chute 30 for convenient threading of the ticket strip 11 from a new supply roll 25 into operating position. Referring particularly to Figs. 4, 7 and 8, a cam member 90 is mounted on the rod 80 and has a cam edge 91 which cooperates with the free end of the supporting arm 70 of the stop unit. This cam 90 is formed with a slot 92 which receives a bar 93 on a lever 95 which is also mounted on rod 80, this assembly in turn being carried by the side plate 81 of the printer frame. The lever 95 is located externally of the unit as a whole for manual operation so that when it is rotated in clockwise direction as viewed in Fig. 7, the cam 90 will be similarly rotated to cause its cam surface 91 to depress the arm 70 sufficiently to withdraw the hook 66 out of the interior of chute 30 so that the new ticket strip can be readily fed through the chute as shown in Fig. 8. When the lever 95 is returned to its normal position shown in Fig. 7, the natural resilience of arm 70 will similarly return hook 66 into its operating position in the path of the strip through chute 30.

Fig. 12 shows an alternative mechanism for effecting desired limited reverse feeding of the strip 11 corresponding to the operation of the invention as described in connection with the roll 33 and spring 75, and certain of the parts in Fig. 12 correspond to the similarly numbered parts in Fig. 1. In addition, a lever arm 100 has a pivotal mounting 101 at one end, and its other end carries a spring finger 102 having a rubber tip 103 and projecting through a slot 104 in the upper wall of chute 30. A spring 105 normally biases lever arm 100 in counterclockwise direction as viewed in Fig. 12.

The cylinder 34 or its supporting shaft carries a cam 110 cooperating with a follower 111 on arm 100. The cam 110 is shown as cylindrical over the major portion of its periphery but has a cut-out 112 located out of radial line with the feed rails 36. Thus throughout the major part of a complete revolution of cylinder 34, cam 110 cooperates with the follower 111 to hold arm 100 in the raised position shown in Fig. 11, but when the forward feeding part of each revolution of cylinder 34 is completed, the follower 111 will drop into the cut-out 112 and thus cause the finger 102 to engage the strip 11 and to give the strip the desired slight reverse feeding stroke necessary to cause engagement of stop 66 with the forward edge of the adjacent perforation 20 in the strip. With this mechanism, the lower wall of the chute 30 will support the strip during the reverse feeding stroke of finger 102.

Fig. 13 shows another arrangement for effecting the reverse feeding of the strip 11 and including mechanism driven directly from the feeding cylinder 34. In Fig. 13, a roller 120 is mounted above chute 30 to extend through a slot 121 in the upper wall of the chute. The roller 120 includes a button portion 122 proportioned for pressure engagement with the strip and the bottom wall of the chute as roller 120 revolves. The roller 120 is provided with a mechanical drive correlating its rotation with that of cylinder 34, a suitable such drive being shown as embodying a chain 125 and sprockets 126 and 127 on cylinder 34 and roller 120 respectively. With this arrangement, the roller 120 will not affect strip 11 except during the small fraction of a complete revolution when the button 122 is in contact with the strip, and since this engagement occurs following completion of the forward feeding movement produced by the feed rolls 36, it will provide the necessary reverse feeding of the strip to effect proper engagement of the stop 66 with the forward edge of the adjacent perforation in the strip.

It will be noted that essentially the same arrangement of perforations and associated stop member may be used with all of the several feeding mechanisms described. At the same time, it will also be apparent that the particular configuration of the individual perforations is not controlling provided each perforation has a forward edge portion located in the same space relation with the printed matter on the associated ticket portion of the continuous strip. Accordingly, the term "perforation" as used herein is not limited to any particular configuration or size and includes slits and other shapes which will provide such desired relationship between the forward edges of the successive perforations and the printed matter appearing on the successive ticket portions of the strip.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In a machine for printing at a printing station on successive ticket portions of a continuous strip of such tickets and severing successive tickets from said strip, apparatus for effecting accurately predetermined register of each such ticket with such printing station, comprising a strip of tickets having therein a plurality of perforations spaced lengthwise of said strip by distances accurately equal to the dimension of each said ticket lengthwise of said strip, feeding means having a predetermined cycle of operation for effecting intermittent advance feeding of said strip a distance slightly greater than a single said ticket length for each said cycle thereof, a stop receivable in successive said perforations and located in a position spaced from said printing station by a distance accurately correlated with a whole number of said ticket lengths, and means having a driving connection with said feeding means for operation at substantially the end of the advance feeding movement of said strip during each said cycle of said feeding means for effecting limited reverse feeding of said strip into a position of engagement of said stop with the forward edge of the adjacent said perforation to establish accurate register of said strip with said printing station.

2. In a machine for printing at a printing station on successive ticket portions of a continuous strip of such tickets and including means for severing successive tickets from said strip at a location in fixed relation with said printing station, apparatus for effecting accurately predetermined register of each such ticket with said printing station, comprising a strip of tickets having therein a plurality of perforations spaced lengthwise of said strip by distances accurately equal to the dimension of each said ticket lengthwise of said strip, feeding means having a predetermined cycle of operation for effecting intermittent advance feeding of said strip a distance slightly greater than a single said ticket length for each said cyle thereof, a stop receivable in successive said perforations and located in position spaced from said severing means by a distance accurately correlated with a whole number of said ticket lengths, means having a driving connection with said feeding means for operation at substantially the end of the advance feeding movement of said strip during each said cycle of said feeding means for effecting limited reverse feeding of said strip into a position of contact of said stop with the forward edge of the adjacent said perforation to establish accurate register of said strip with said severing means and printing station, and means operative upon commencement of the next said cycle of said feeding means for effecting release of said stop from the associated said perforation in said strip.

3. In a machine for printing at a printing station on successive ticket portions of a continuous strip of such tickets and severing successive tickets from said strip, apparatus for effecting accurately predetermined register of each such ticket with such printing station, comprising a strip of tickets having therein a plurality of perforations spaced lengthwise of said strip by distances accurately equal to the dimension of each said ticket lengthwise of said strip, feeding means having a predetermined cycle of operation for effecting intermittent advance feeding of said strip a distance slightly greater than a single said ticket length for each said cycle thereof, a stop member located in position spaced from said printing station by a distance accurately correlated with a whole number of said ticket lengths, means biasing said stop member into engagement with said advancing strip for projection into each successive said perforation at approximately the end of the advance feeding movement of said strip during each said cycle of said feeding means, means having a driving connection with said feeding means for operation following each said advance feeding movement of said strip to cause limited reverse feeding of said strip into a position of engagement of said stop member with the forward edge of the adjacent said perforation to establish accurate register of said strip with said printing station, and said stop member including a cam portion on the side thereof opposite said printing station for effecting relative movement of said stop out of said perforation upon commencement of the advance feeding movement of said strip in the next said cycle of said feeding means.

4. In a machine for printing at a printing station on successive ticket portions of a continuous strip of such tickets and including means for severing successive tickets from said strip, apparatus for effecting accurately predetermined register of each such ticket with such printing station, comprising a strip of tickets having therein a plurality of perforations spaced lengthwise of said strip by distances accurately equal to the dimension of each said ticket lengthwise of said strip, feeding means having a predetermined cycle of operation for effecting intermittent advance feeding of said strip a distance slightly greater than a single said ticket length for each said cycle thereof, a stop member engageable with said perforations and located in position spaced from said severing means by a distance accurately correlated with a whole number of said ticket lengths, means for biasing said stop member towards said strip to cause engagement thereof with each successive said perforation at approximately the end of each said feeding movement of said strip, means including a part of said feeding means responsive to completion of each said advance feeding movement of said strip for causing reverse feeding of said strip into a position of engagement of said stop member with the forward edge of the adjacent said perforation to establish accurate register of said strip with said printing station, and means on said stop member for effecting release of said stop member from said perforation upon commencement of the advance feeding movement of said strip in the next said cycle of said feeding means.

5. In a machine for printing at a printing station on successive ticket portions of a continuous strip of such tickets and including means for severing successive tickets from said strip, apparatus for effecting accurately predetermined register of each such ticket with such printing station, comprising a strip of tickets having therein a plurality of perforations spaced lengthwise of said strip by distances accurately equal to the dimension of each said ticket lengthwise of said strip, feeding means having a predetermined cycle of operation for effecting intermittent advance feeding of said strip a distance slightly greater than a single said ticket length for each said cycle thereof, a stop member engageable with said perforations and located in position spaced from said severing means by a distance accurately correlated with a whole number of said ticket lengths, means for biasing said stop member towards said strip to cause engagement thereof with each successive said perforation at approximately the end of each said feeding movement of said strip, means having a driving connection with said feeding means for operation in response to completion of each said advance feeding movement of said strip for causing reverse feeding of said strip into a position of engagement of said stop member with the forward edge of adjacent said perforation to establish accurate register of said strip with said printing station, and means for effecting temporary removal of said stop member from the path of said strip to facilitate initial threading of said strip into said machine.

6. Apparatus for effecting accurately controlled feeding of a continuous strip having therein a plurality of perforations spaced lengthwise of said strip by uniform distances, comprising a pair of cooperating feeding rolls for feeding said strip therebetween, one of said rolls being a driving roll and the other being a driven roll, intermittently operable means for rotating said driving roll through a complete revolution establishing a cycle of operation thereof, means on said driving roll for effecting pressure engagement thereof with said driven roll through said strip during a limited fraction of a complete revolution of said driving roll proportioned to cause advance feeding of said strip a distance slightly greater than the distance between a pair of said perforations for each said cycle, a stop located adjacent the path of said strip through said rolls and receivable in successive said perforations at approximately the end of each said advance feeding movement of said strip, means effective at substantially the end of said advance feeding movement of said strip during each said cycle for driving said driven roll in the reverse direction to cause reverse feeding of said strip into a position of engagement of said stop with the forward edge of the adjacent said perforation, and means responsive to commencement of the next said cycle of said feeding rolls for effecting release of said stop from said strip.

7. Apparatus for effecting accurately controlled feeding of a continuous strip having therein a plurality of perforations spaced lengthwise of said strip by uniform distances, comprising a pair of cooperating feeding rolls for feeding said strip therebetween, one of said rolls being a driving roll and the other being a driven roll, intermittently operable means for rotating said driving roll through a complete revolution establishing a cycle of operation thereof, means for effecting driving engagement of said rolls with said strip during a limited fraction of a complete revolution of said driving roll proportioned to cause advance feeding of said strip a distance slightly greater than the distance between each adjacent pair of said perforations for each said cycle, a stop receivable in successive said perforations and located adjacent the path of said strip through said rolls, means responsive to completion of said advance feeding movement of said strip for driving said driven roll in the reverse direction during each said cycle to cause reverse feeding of said strip into a position of engagement of said stop with the forward edge of the adjacent said perforation, and means responsive to commencement of the next said cycle of said feeding rolls for effecting release of said stop from said strip.

8. Apparatus for effecting accurately controlled feeding of a continuous strip having therein a plurality of perforations spaced lengthwise of said strip by uniform distances, comprising a pair of cooperating feeding rolls for feeding said strip therebetween, one of said rolls being a driving roll the other being a driven roll, intermittently operable means for rotating said driving roll through a complete revolution establishing a cycle of operation thereof, friction means on said driving roll for effecting driving engagement thereof with said driven roll through said strip during a limited fraction of a complete revolution of said driving roll proportioned to cause advance feeding of said strip a distance slightly greater than the distance between each adjacent pair of said perforations for each said cycle, a stop receivable in successive said perforations and located adjacent the path of said strip through said rolls, means effective at substantially the end of said advance feeding of said strip during each said cycle for driving said driven roll in the reverse direction, and anti-friction means on said driving roll for maintaining said strip in pressure engagement with said driven roll following said feeding movement to cause reverse feeding of said strip by said driven roll into a position of engagement of said stop with the forward edge of the adjacent said perforation.

9. Apparatus of the character described for effecting accurately controlled incremental feeding of a continuous strip having therein a plurality of perforations spaced lengthwise thereof by predetermined uniform distances, comprising feeding means for said strip including a feed roll positioned for pressure engagement with said strip, intermittently operable means for driving said feed roll in the direction to advance said strip, means establishing a cycle of operation for said driving means causing rotation of said feed roll during each said cycle through a predetermined angle effecting advance feeding of said strip through a distance slightly greater than the distance between each adjacent pair of said perforations, a stop located adjacent the path of said strip and receivable in successive said perforations, and means responsive to completion of said advance feeding action of said feed roll during each said cycle for driving said feed roll in the reverse direction to cause reverse feeding of said strip into a position of engagement of said stop with the forward edge of the adjacent said perforation.

References Cited in the file of this patent

UNITED STATES PATENTS

| | | |
|---|---|---|
| 1,110,810 | McDonald | Sept. 15, 1914 |
| 1,859,962 | Ferenci | May 24, 1932 |
| 1,939,717 | Morse | Dec. 19, 1933 |
| 2,361,626 | Helsel | Oct. 31, 1944 |
| 2,721,077 | Russell et al. | Oct. 18, 1955 |